United States Patent
Macher et al.

(12) 
(10) Patent No.: US 6,429,242 B1
(45) Date of Patent: Aug. 6, 2002

(54) SOLVENT WELD CEMENT COMPOSITION IN AEROSOL FORM

(75) Inventors: Robert J. Macher, Fenton; Allen L. Smith, St. Louis, both of MO (US)

(73) Assignee: Camie-Campbell, Inc., St. Louis, MO (US)

( * ) Notice: Subject to any disclaimer, the term of this patent is extended or adjusted under 35 U.S.C. 154(b) by 76 days.

(21) Appl. No.: 09/689,383

(22) Filed: Oct. 12, 2000

Related U.S. Application Data

(60) Provisional application No. 60/195,502, filed on Apr. 6, 2000.

(51) Int. Cl.$^7$ .................................................. C08K 5/15
(52) U.S. Cl. ...................... 524/113; 524/174; 524/320; 524/321; 524/360; 524/361
(58) Field of Search ................................ 524/113, 360, 524/361, 320, 321

(56) References Cited

U.S. PATENT DOCUMENTS

| | | |
|---|---|---|
| 3,926,894 A | 12/1975 | de Paul Clark |
| 4,126,504 A | 11/1978 | Wolinski et al. |
| 4,200,480 A | 4/1980 | Wolinski et al. |
| 4,343,921 A | 8/1982 | Piestert |
| 4,401,271 A | 8/1983 | Hansen |
| 4,425,179 A | 1/1984 | Bauer et al. |
| 4,608,280 A | 8/1986 | Robinson et al. |
| 4,675,354 A | 6/1987 | Sperling |
| 4,687,798 A | 8/1987 | King, Sr. |
| 4,910,244 A | 3/1990 | Dierdorf et al. |
| 5,252,634 A | 10/1993 | Patel et al. |
| 5,352,390 A | 10/1994 | Hilton et al. |
| 5,422,388 A | 6/1995 | Patel et al. |
| 5,470,894 A | 11/1995 | Patel et al. |
| 5,656,345 A | 8/1997 | Strand et al. |
| 5,683,536 A | 11/1997 | Kneafsey |
| 5,852,091 A | 12/1998 | Waldrop et al. |

FOREIGN PATENT DOCUMENTS

| | | |
|---|---|---|
| EP | 0 489 485 A1 | 6/1992 |

OTHER PUBLICATIONS

Designation: F 493–96 "Solvent Cements for Cholrinated Poly(Vinyl Chloride) (CPVC) Plastic Pipe and Fittings", American Society For Testing And Materials, Nov. 1996.
Designation: D 3138–95 "Solvent Cements for Transition Joints Between Acrylonitrile–Butadiene–Styrene (ABS) and Poly(Vinyl Chloride) (PVC) Non–Pressure Piping Components", American Society For Testing And Materials, Nov. 1995.

*Primary Examiner*—Edward J. Cain
(74) *Attorney, Agent, or Firm*—Blackwell Sanders Peper Martin LLP

(57) ABSTRACT

Solvent weld cement (SWC) is used to fuse polymer pipes together. SWC is conventionally dispensed in liquid form from an open container by a swab or brush, resulting in release of fumes, oxidation and contamination of the SWC, as well as environmental contamination due to spilled SWC. A SWC is provided which remains stable while being stored in and dispensed from an aerosol container. The SWC composition comprises a polymer resin, CPVC, a solvent system including tetrahydrofuran, and at least one conventional propellant to allow the SWC to be dispensed from an aerosol container. The resulting SWC remains stable during storage, and when dispensed from the aerosol can provides a SWC with improved uniformity of application, ease of application, greater set-up time, and a SWC which is environmentally friendly.

41 Claims, No Drawings

SOLVENT WELD CEMENT COMPOSITION IN AEROSOL FORM

CROSS-REFERENCE TO RELATED APPLICATION

This application claims priority to provisional application Serial No. 60/195,502, filed Apr. 6, 2000.

BACKGROUND OF THE INVENTION

The present invention relates in general to an aerosol solvent weld cement and pertains more particularly to a solvent weld cement composition which comprises at least one polymer resin, at least one welding solvent, and at least one conventional propellant, the solvent weld cement being stable when stored in and dispensed from an aerosol container. The solvent weld cement (SWC) of the present invention is an improvement over conventional SWC since SWC has not previously been successfully stored and dispensed by aerosol means.

Plastic pipe, primarily polyvinyl chloride (PVC) and post chlorinated polyvinyl chloride (CPVC) is commonly used as underground water pipe and for other applications. Plastic pipe is replacing ceramic and metal pipe due to its reduced weight, lower cost, and resistance to cracking under stress. Another advantage of plastic pipe is the capability of forming watertight junctions when attached using SWC in contrast to ceramic pipe interference fittings and metal pipe welded joints. The use of SWC allows joining of the pipes by relatively unskilled workers as compared to the use of welding or soldering equipment with metal pipes.

Unfortunately, application of the adhesive to the pipefittings and joints often takes place within trenches, where there is no convenient location to place the SWC container. SWC is conventionally applied in liquid form with a swab from an open container. The open container releases fumes into the atmosphere, and allows air and moisture to contaminate the remaining SWC. In addition, the open containers are susceptible of being contaminated with dirt or debris, which may affect the performance of the SWC. Further, the container is easily spilled, contaminating the soil with hazardous substances, as well as increasing the time and resources necessary to complete the job.

The application of a liquid SWC by use of a swab or brush does not consistently provide optimum uniformity of application. This can result in incomplete bonding of the joints where too little SWC is applied, and waste as well as environmental concerns where the application is excessive.

Solvent weld cements have not been previously stored and dispensed by aerosol means. Use of an aerosol dispensing system would provide ease of application and the prevention of environmentally unkind spills.

SUMMARY OF THE INVENTION

Accordingly, it is an object of the present invention to provide a SWC that can be stored in an aerosol container without gelling of the SWC.

Another object of the present invention is to provide a SWC that can be dispensed by aerosol means.

Still another object of the present invention is to provide a SWC that can easily and uniformly be applied using one hand.

Yet another object of the present invention is to provide a SWC that is dispensed from a container which is not open for solvent evaporation, oxidation or physical contamination of the SWC.

A further object of the present invention is to provide a SWC that cannot be spilled by the user, thereby preventing ground contamination by the SWC.

Still a further object of the present invention is to provide a SWC that can be applied quickly thereby providing additional working time or set up time before the SWC hardens.

Yet a further object of the present invention is to provide a SWC in an aerosol container which complies with current volatile organic compounds (V.O.C.). requirements as mandated by federal and local governments.

To accomplish the foregoing and other objects of this invention there is provided a SWC composition that can be stored in and dispensed from an aerosol container without gelling of the SWC. The SWC composition disclosed herein is easily and uniformly applied, and it allows the user a longer set up time in which to complete the joints as compared to the conventional swab application method. Further, the SWC provided herein is not vulnerable to solvent loss and hence gelling, oxidation or physical contamination, and cannot be spilled during application. It has been discovered that the SWC disclosed herein meets all of the objects of the present invention.

The SWC composition comprises a polymer resin, preferably CPVC or a CPVC/PVC blend, partially dissolved in a solvent mixture including tetrahydrofuran (THF), cyclohexanone, butyrolactone and acetone. The composition further comprises a viscosity modifier/flow control agent, an organotin compound, and an optional dye, utilized to aid in application. The composition is then mixed with a propellant, preferably dimethyl ether, and packaged in a conventional nonferrous aerosol container.

Solvent based adhesives such as SWC work primarily by two means of action. First, the solvent portion of the formulation softens the outer surfaces of the pipe. Then, as the solvent evaporates, the pipe surfaces harden or "cure". Second, as the solvent evaporates, the resin dissolved in the adhesive dries. The resin acts to fill the small gaps between the pipe and the fittings and to increase the viscosity of the product.

These and other objects and features of the present invention will be better understood and appreciated from the following detailed description of the following embodiments, selected for the purposes of illustration.

DETAILED DESCRIPTION

The presently preferred polymer resin in the SWC composition is CPVC, or a CPVC/PVC blend. Use of a formula including CPVC resin results in the SWC being considered a "universal" pipe cement, as it is suitable for joining PVC, CPVC, Acrylonitrile Butadiene Styrene (ABS) and butyrate pipe. Other polymer resins, including but not limited to PVC, ABS, acrylic resins and blends thereof, may be utilized in the aerosol SWC of the present invention, however, the resulting SWC will not be a universal cement as defined above.

The percent resin utilized is determined by many factors, including the ASTM standards, D-3138-95, F-493, D-2564. (All percentages given herein are wt/wt % based on the total weight of the composition unless otherwise indicated.) In addition, as the percent resin increases, the instability of the product due to premature gelling increases exponentially. The preferred percent of resin in the composition is about 14.5 to 20%, more preferred about 14.5 to 16.0% with about 14.5% being most preferred, resulting in a SWC containing about 10–11% resin solids. This percent meets ASTM standards, provides satisfactory strength of bond, and resists gelling during storage.

The presently preferred solvent system is a mixture of tetrahydrofuran (THF), cyclohexanone, butyrolactone and acetone. This solvent system meets or exceeds current government mandated V.O.C. requirements THF is utilized because it easily dissolves the polymer resin, and instantly softens or etches the surface of the pipe or fittings to be joined, resulting in a more secure attachment. The preferred range of THF is about 20 to 45%, more preferred is about 20 to 30%, and most preferred is about 26%.

Cyclohexanone is utilized to lengthen the working time, or set-up time, of the SWC, as cyclohexanone has a lower vapor pressure than THF. This component is important because by extending the working time the SWC becomes easier to use. The presently preferred range of cyclohexanone is about 0 to 20%, more preferred is about 5 to 10% and most preferred is about 7%.

Another solvent, butyrolactone, is added in the following percentages. The preferred range of butyrolactone is about 1 to 15%, more preferred is about 2 to 8%, and most preferred is about 5%. This solvent is utilized because it has a lower vapor pressure than cyclohexanone, which aids in further lengthening the working time of the SWC. At the same time, butyrolactone dissolves the polymer resin better than cyclohexanone.

Acetone is added to the composition in the following percentages. The preferred range of acetone is about 10 to 40%, more preferred is about 20 to 30%, and most preferred is about 26%. While acetone is a poor solvent for CPVC resins, it is utilized in order to remain compliant with the federal government's maximum volatile organic compounds (V.O.C.) requirements. Unfortunately, acetone is also a source of water contamination. Water is the primary cause of premature product gelling. Higher percentages of acetone therefore increase product instability.

Additional components may be added to improve the performance of the SWC, such as viscosity modifier/flow control agents including but limited to fumed silica, clays and mixtures thereof. Presently preferred is fumed silica, AEROSIL by Degussa, or Cab-O-Sil by Cabot Corporation. Controlling the viscosity is required to insure that the SWC clings to and remains in place on the pipe and/or fittings until the pieces are mated together. The presently preferred percentage of fumed silica is about 1.5 to 5.5%, more preferred is about 2.5 to 4.5%, and most preferred is about 3.5%.

An organ compound is preferably added as a stabilizer. Acceptable organotin compounds include alkylated tin IV compounds, dibutyltin dilaurate, di-n-octyl tin dimercaptide, dibutyltin thioesters, di-n-octyltin maleate, dibutyltin carboxylates and dibutyltin dithioglycolates. Presently preferred is ADVASTAB® TM-161, by Morton International Inc., a methyltin mercaptide, composed of dimethyltin bis (2-ethylhexylthioglycolate) CAS#57583-35-4 approximately 60–100wt % and methyltin tris(2-ethylhexylthioglycolate)CAS#a57583-34-3 approximately 10–30wt % and its thio ester approximately 1–5wt %, also known as tin soap. It is utilized herein as a stabilizer to prevent premature degradation of the CPVC resin, which contributes to gelling problems. The presently preferred range of ADVASTAB is a composition percentage of about 0.25 to 1.00%, most preferred is about 0.5%.

A dye may be added to the composition to facilitate application, as the composition is difficult to see when sprayed on polymer pipe. The dye does not serve any other purpose, and is not necessary for satisfactory performance of the SWC composition. The presently preferred dye is Keystone Purple 706-404-40, preferably about 182 g per 50 gallons of SWC.

Suitable propellants include dimethyl ether, propane, butane and isobutane Dimethyl ether (DME) is the presently preferred propellant for this composition. The presently preferred range of dimethyl ether is about 10 to 50%, more preferred is about 20 to 40%, and most preferred is about 30%. DME is preferred because it has the highest solvency by a wide margin of any propellant currently used in aerosol packaging.

The presently preferred container means for the SWC composition includes stainless steel, glass and aluminum, with aluminum being presently most preferred.

Any conventional aerosol spray nozzle system may be utilized, as the SWC does not require any special spraying equipment. A container with a 360° spray anyway valve and an unrestricted actuator is presently preferred as this configuration will allow the SWC to be sprayed from any angle, or direction, even upside down. This aids in evenly applying the SWC under typical application conditions.

EXAMPLE

A mixing tank is charged with 30 lbs. of THF by SISAS Inc, using a 1-inch diaphragm or other appropriate pump. The mixer is turned on a slow speed and 14.4 lbs. of resin grade CPVC, TempRite CPVC Resin CAS#68648-82-8 by B.F. GOODRICH, is added. These components are then mixed for 15 to 30 minutes on low speed, checking for resin cut in. Fumed silica, 4.9 lbs. of AEROSIL 200 (Degussa) is added and mixed until a homogenous mixture is formed. An additional 7 lbs. of THF is then introduced to achieve first solids. The following components are then added in the order listed: 7 lbs. of butyrolactone, by International Specialty Chemical; 10 lbs. of cyclohexanone by BASF Corp; 26 lbs of acetone by Eastman Chemical; and 0.6 lbs. of ADVASTAB TM-161 by Morton International Inc.

After mixing until a homogenous mixture is formed, solids and viscosity levels are checked. Final adjustments of the solids should be made with a solvent mixture of 60% THF and 40% acetone. Presently preferred are solids 19%+/–2.0%, and viscosity 1650+/–300 centipoise with spindle 3 at a speed of 12 on a Brookfield DV-E viscometer or equivalent.

A dye is then added, 182.1 grams of Keystone Purple 706-404-40 per 50-gallon drum of SWC.

The SWC is then filtered through a 150-micron bag prior to pumping into storage containers. The resultant SWC is then packaged into aluminum aerosol containers with the propellant, 30% by wt dimethyl ether. The containers, manufactured by CCL Container, are then fitted with Seaquist AR spray anyway valves and Seaquist RAR-8 actuators.

The SWC composition was tested for storage stability. The Advanced Monobloc Aerosol Division of CCL Container, the company which produced the aluminum containers in which the SWC product was packaged, has tested the stability of the SWC during storage. Under accelerated shelf life storage conditions (100 degrees F.), the SWC was found to be 100% stable, no gelling, after 90 days.

In addition, the following shelf life storage tests were conducted:

|  | Testing Period | Results |
| --- | --- | --- |
| Conditions | | |
| Ambient temperature | 2 years | 100% stable |
| Accelerated conditions | | |
| 120° F. | 180 days | 100% stable |

From the foregoing description those skilled in the art will appreciate that all of the objects of the present invention are realized. A SWC has been provided which can be stored in and dispensed by aerosol means without gelling of the SWC. The aerosol SWC can be easily, quickly and uniformly applied using one hand, resulting in a longer working time for the SWC. Finally, the SWC is dispensed from a container which both protects the SWC from solvent evaporation, oxidation and physical contamination, while protecting the environment by preventing unwanted spills.

While a specific embodiment has been shown and described, many variations are possible. A commercially available nozzle and actuator has been disclosed, but any suitable aerosol means may be substituted. While an aluminum aerosol container is presently preferred, any non-ferrous container may be used. Further, while one of the primary benefits of the SWC composition of the present invention is its compatibility with aerosol means, the SWC may be applied using any conventional method, including but not limited to rolling, brushing and non-aerosol spray methods.

Although the presently preferred solvent system has been described, many variations are possible. Of note, the cyclohexanone portion of the solvent may be replaced by THF, butyrolactone, and mixtures thereof.

The fumed silica AEROSIL 200 is the preferred viscosity modifier, but clays or other silica may suitably be substituted. Finally, the dye Keystone Purple is preferred, but any suitable dye in any concentration that does not interfere with the performance of the SWC may be utilized.

Having described the present invention in detail, those skilled in the art will appreciate that modifications may be made of the present invention without departing from its spirit and scope. For example, although the present aerosol solvent weld cement composition has been described with reference to joining two polymer or plastic type pipes, it is recognized and anticipated that the present composition can be utilized to join any two polymer type members. Therefore, it is not intended that the scope of the present invention be limited to the specific examples and embodiments described herein. It is also contemplated that other modifications and applications, or equivalents thereof, will occur to those skilled in the art. It is accordingly intended that the claims set forth below shall cover all such changes, modifications, variations and other uses and applications that do not depart from the spirit and scope of the present invention as described herein.

Other aspects, objects and advantages of the present invention can be obtained from a study of the disclosure and the appended claims.

What is claimed is:

1. An aerosol solvent weld cement comprising:
   about 14.5 to 20.0 wt % of at least one polymer resin;
   about 30 to 75 wt % of at least one solvent in which the polymer resin can be dissolved; and
   about 10 to 50 wt % of at least one aerosol propellant.

2. The aerosol solvent weld cement of claim 1 wherein the polymer resin is selected from the group consisting of CPVC, PVC, ABS, acrylic resins and mixtures thereof.

3. The aerosol weld cement of claim 1 wherein the solvent is selected from the group consisting of tetrahydrofuran, cyclohexanone, butyrolactone, acetone and mixtures thereof.

4. The aerosol weld cement of claim 1 wherein the propellant is selected from the group consisting of dimethyl ether, propane, butane, isobutane and mixtures thereof.

5. The aerosol weld cement of claim 1 further including about 1.5 to 5.5 wt % of at least one viscosity modifier/flow control agent.

6. The aerosol weld cement of claim 5 wherein the viscosity modifier/flow control agent is selected from the group consisting of silica, clay and mixtures thereof.

7. The aerosol weld cement of claim 1 farther including about 0.25 to 1.00 wt % of at least one organotin compound.

8. The aerosol weld cement of claim 7 wherein the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

9. The aerosol weld cement of claim 1 further including a dye compound.

10. An aerosol solvent weld cement composition comprising:
    about 14.5 to 16.0 wt % of at least one polymer resin;
    about 30 to 75 wt % of at least one solvent in which the polymer resin can be dissolved;
    about 20 to 40 wt % of at least one aerosol propellant;
    about 2.5 to 4.5 wt % of at least one viscosity modifier/flow control agent, and
    about 0.25 to 1.00 wt % of at least one organotin compound,
    whereby the solvent weld cement is stored in and dispensed from an aerosol container.

11. The aerosol solvent weld cement of claim 10 wherein the polymer resin is selected from the group consisting of CPVC, PVC, ABS, acrylic resins and mixtures thereof.

12. The aerosol weld cement of claim 10 wherein the solvent is selected from the group consisting of tetrahydrofuran, cyclohexanone, butyrolactone, acetone and mixtures thereof.

13. The aerosol weld cement of claim 10 wherein the propellant is selected from the group consisting of dimethyl ether, propane, butane, isobutane and mixtures thereof.

14. The aerosol weld cement of claim 10 wherein the viscosity modifier/flow control agent is selected from the group consisting of silica, clay and mixtures thereof.

15. The aerosol weld cement of claim 10 wherein the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

16. The aerosol weld cement of claim 10 further including a dye compound.

17. An aerosol weld cement composition comprising
    about 14.5 to 16.0 wt % of at least one polymer resin;
    about 20 to 45 wt % of tetrahydrofuran;
    about 0 to 20 wt % of cyclohexanone;
    about 1 to 15 wt % of butyrolactone;
    about 10 to 40 wt % of acetone;
    about 20 to 40 wt % of at least one aerosol propellant;
    about 2.5 to 4.5 wt % of at least one viscosity modifier/flow control agent; and
    about 0.25 to 1.00 wt % of at least one organotin compound, whereby the solvent weld cement resists gelling when stored in and dispensed from an aerosol container.

18. The aerosol solvent weld cement of claim 17 wherein the polymer resin is selected from the group consisting of CPVC, PVC, ABS, acrylic resins and mixtures thereof.

19. The aerosol weld cement of claim 17 wherein the propellant is selected from the group consisting of dimethyl ether, propane, butane, isobutane and mixtures thereof.

20. The aerosol weld cement of claim 17 wherein the viscosity modifier/flow control agent is selected from the group consisting of silica, clay and mixtures thereof.

21. The aerosol weld cement of claim 17 wherein the organontion compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

22. The aerosol weld cement of claim 17 further including a dye compound.

23. An aerosol weld cement composition comprising
about 14.5 wt % of at least one polymer resin;
about 26 wt % of tetrahydrofuran;
about 7 wt % of cyclohexanone;
about 5 wt % of butyrolactone;
about 26 wt % of acetone;
about 30 wt % of at least one aerosol propellant;
about 3.5 wt % of at least one viscosity modifier/flow control agent; and
about 0.5 wt % of at least one organotin compound,
whereby the solvent weld cement resists gelling when stored in and dispensed from an aerosol container.

24. The aerosol solvent weld cement of claim 17 wherein the polymer resin is selected from the group consisting of CPVC, PVC, ABS, acrylic resins and mixtures thereof.

25. The aerosol weld cement of claim 23 wherein the propellant is selected from the group consisting of dimethyl ether, propane, butane, isobutane and mixtures thereof.

26. The aerosol weld cement of claim 23 wherein the viscosity modifier/flow control agent is selected from the group consisting of silica, clay and mixtures thereof.

27. The aerosol weld cement of claim 23 wherein the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

28. The aerosol weld cement of claim 23 further including a dye compound.

29. A method of making an aerosol solvent weld cement composition comprising combining:
about 14.5 to 20.0 wt % of at least one polymer resin;
about 30 to 75 wt % of at least one solvent in which the polymer resin can be dissolved; and
about 10 to 50 wt % of at least one aerosol propellant;
whereby a solvent weld cement that resists gelling when stored in and dispensed from an aerosol container is formed.

30. The method of claim 29 wherein the polymer resin is selected from the group consisting of CPVC, PVC, ABS, acrylic resins and mixtures thereof;
the solvent is selected from the group consisting of tetrahydrofuran, cyclohexanone, butyrolactone, acetone and mixtures thereof; and
the propellant is selected from the group consisting of dimethyl ether, propane, butane, isobutane and mixtures thereof.

31. The method of claim 29 further including combining about 1.5 to 5.5 wt % of at least one viscosity modifier/flow control agent.

32. The method of claim 31 wherein the viscosity modifier/flow control agent is selected from the group consisting of silica, clay and mixtures thereof.

33. The method of claim 29 further including combining about 0.25 to 1.00 wt % of at least one organotin compound.

34. The method of claim 33 wherein the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

35. The method of claim 29 further including the addition of a dye compound.

36. A method of making an aerosol solvent weld cement composition comprising combining:
about 14.5 to 16.0 wt % of at least one polymer resin;
about 30 to 75 wt % of at least one solvent in which the polymer resin can be dissolved;
about 20 to 40 wt % of at least one aerosol propellant;
about 2.5 to 4.5 wt % of at least one viscosity modifier/flow control agent, and
about 0.25 to 1.00 wt % of at least one organotin compound,
whereby a solvent weld cement that resists gelling when stored in and dispensed from an aerosol container is formed.

37. The method of claim 36 wherein the polymer resin is selected from the group consisting of CPVC, PVC, ABS, acrylic resins and mixtures thereof;
the solvent is selected from the group consisting of tetrahydrofuran, cyclohexanone, butyrolactone, acetone and mixtures thereof;
the propellant is selected from the group consisting of dimethyl ether, propane, butane, isobutane and mixtures thereof;
the viscosity modifier/flow control agent is selected from the group consisting of silica, clay and mixtures thereof; and
the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

38. The method of claim 36 further including the addition of a dye compound.

39. A method of making an aerosol weld cement composition comprising combining:
about 14.5 wt % of at least one polymer resin;
about 26 wt % of tetrahydrofuran;
about 7 wt % of cyclohexanone;
about 5 wt % of butyrolactone;
about 26 wt % of acetone;
about 30 wt % of at least one aerosol propellant;
about 3.5 wt % of at least one viscosity modifier/flow control agent; and
about 0.5 wt % of at least one organotin compound,
whereby a solvent weld cement that resists gelling when stored in and dispensed from an aerosol container is formed.

40. The method of claim 39 wherein the polymer resin is selected from the group consisting of CPVC, PVC, ABS, acrylic resins and mixtures thereof;
the solvent is selected from the group consisting of tetrahydrofuran, cyclohexanone, butyrolactone, acetone and mixtures thereof;
the propellant is selected from the group consisting of dimethyl ether, propane, butane, isobutane and mixtures thereof;

the viscosity modifier/flow control agent is selected from the group consisting of silica, clay and mixtures thereof; and the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

41. The method of claim 39 further including the addition of a dye compound.

* * * * *

UNITED STATES PATENT AND TRADEMARK OFFICE
CERTIFICATE OF CORRECTION

PATENT NO.    : 6,429,242 B1
DATED         : August 6, 2002
INVENTOR(S)   : Macher, Robert J. et al.

It is certified that error appears in the above-identified patent and that said Letters Patent is hereby corrected as shown below:

Column 3,
Line 48, delete "organ" and replace with -- organotin --.

Signed and Sealed this

Twenty-sixth Day of November, 2002

Attest:

JAMES E. ROGAN
Attesting Officer        Director of the United States Patent and Trademark Office

(12) EX PARTE REEXAMINATION CERTIFICATE (5826th)
United States Patent
Macher et al.

(10) Number: US 6,429,242 C1
(45) Certificate Issued: Jul. 24, 2007

(54) SOLVENT WELD CEMENT COMPOSITION IN AEROSOL FORM

(75) Inventors: Robert J. Macher, Fenton, MO (US); Allen L. Smith, St. Louis, MO (US)

(73) Assignee: Camie-Campbell, Inc., St. Louis, MO (US)

Reexamination Request:
No. 90/006,878, Dec. 1, 2003

Reexamination Certificate for:
Patent No.: 6,429,242
Issued: Aug. 6, 2002
Appl. No.: 09/689,383
Filed: Oct. 12, 2000

Certificate of Correction issued Nov. 26, 2002.

Related U.S. Application Data

(60) Provisional application No. 60/195,502, filed on Apr. 6, 2000.

(51) Int. Cl.
*C09K 3/30* (2006.01)
*C08K 5/00* (2006.01)
*C08K 5/1535* (2006.01)

(52) U.S. Cl. ........................ 524/113; 524/174; 524/320; 524/321; 524/360; 524/361

(58) Field of Classification Search ............. None
See application file for complete search history.

(56) References Cited

U.S. PATENT DOCUMENTS

| | | | |
|---|---|---|---|
| 3,332,903 A | * | 7/1967 | Kavalir ..................... 524/364 |
| 3,933,744 A | | 1/1976 | Coates et al. ......... 260/45.75 S |
| 6,454,876 B1 | * | 9/2002 | Ochomogo et al. ........... 134/42 |
| 6,652,704 B2 | | 11/2003 | Green |

* cited by examiner

*Primary Examiner*—Kiley Stoner

(57) ABSTRACT

Solvent weld cement (SWC) is used to fuse polymer pipes together. SWC is conventionally dispensed in liquid form from an open container by a swab or brush, resulting in release of fumes, oxidation and contamination of the SWC, as well as environmental contamination due to spilled SWC. A SWC is provided which remains stable while being stored in and dispensed from an aerosol container. The SWC composition comprises a polymer resin, CPVC, a solvent system including tetrahydrofuran, and at least one conventional propellant to allow the SWC to be dispensed from an aerosol container. The resulting SWC remains stable during storage, and when dispensed from the aerosol can provides a SWC with improved uniformity of application, ease of application, greater set-up time, and a SWC which is environmentally friendly.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–23, 25–28 & 36–41 is confirmed.

Claims 7 & 33 are cancelled.

Claims 1, 8, 24, 29 & 34 are determined to be patentable as amended.

Claims 2–6, 9, 30–32 & 35, dependent on an amended claim, are determined to be patentable.

New claims 42–47 are added and determined to be patentable.

1. An aerosol solvent weld cement comprising:
about 14.5 to 20.0 wt % of at least one polymer resin;
about 30 to 75 wt % of at least one solvent in which the polymer resin can be dissolved;
*about 0.25 to 1.00 wt % of at least one organotin compound;* and
about 10 to 50 wt % of at least one aerosol propellant.

8. The aerosol weld cement of claim [7] *1* wherein the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

24. The aerosol solvent weld cement of claim [17] *23* wherein the polymer resin is selected from the group consisting of CPVC, PVC, ABS, acrylic resins and mixtures thereof.

29. A method of making an aerosol solvent weld cement composition comprising combining:
about 14.5 to 20.0 wt % of at least one polymer resin;
about 30 to 75 wt % of at least one solvent in which the polymer resin can be dissolved;
*about 0.25 to 1.00 wt % of at least one organotin compound;* and
about 10 to 50 wt % of at least one aerosol propellant;
whereby a solvent weld cement that resists gelling when stored in and dispensed from an aerosol container is formed.

34. The method of claim [33] *29* wherein the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.

*42. An aerosol solvent weld cement for joining a pipe and one or more pipe fittings, the aerosol solvent weld cement comprising:*
*about 14.5 to 20.0 wt % of at least one polymer resin;*
*about 30 to 75 wt % of at least one solvent in which the polymer resin can be dissolved so that the dissolved resin fills any small gaps between the pipe and the pipe fitting to form a leak-resistant joint;*
*about 1.5 to 5.5 wt % of a viscosity modifier/flow control agent, said viscosity modifier/flow control agent selected from the group consisting of fumed silica, clays and mixtures thereof; and*
*about 10 to 50 wt % of at least one aerosol propellant.*

*43. The aerosol solvent weld cement of claim 42 wherein the polymer resin is selected from the group consisting of CPVC, PVC, ABS, acrylic resins and mixtures thereof.*

*44. The aerosol weld cement of claim 42 wherein the solvent is selected from the group consisting of tetrahydrofuran, cyclohexanone, butyrolactone, acetone and mixtures thereof.*

*45. The aerosol weld cement of claim 42 wherein the propellant is selected from the group consisting of dimethyl ether, propane, butane, isobutane and mixtures thereof.*

*46. The aerosol weld cement of claim 42 farther comprises about 0.25 to 1.00 wt % of at least one organotin compound.*

*47. The aerosol weld cement of claim 46 wherein the organotin compound is selected from the group consisting of alkylated tin IV compounds, dibutyltin dilaurate, di-n-octyl tin dimercaptide, dibutyltin thioesters, di-n-octyltin maleate, dibutyltin carboxylates and dibutyltin dithioglycolates.*

\* \* \* \* \*